(12) United States Patent
Ichikawa

(10) Patent No.: US 7,600,142 B2
(45) Date of Patent: Oct. 6, 2009

(54) INTEGRATED CIRCUIT CONSERVING POWER DURING TRANSITIONS BETWEEN NORMAL AND POWER-SAVING MODES

(75) Inventor: Takeshi Ichikawa, Tokyo (JP)

(73) Assignee: Oki Semiconductor Co., Ltd., Yokohama (JP)

( * ) Notice: Subject to any disclaimer, the term of this patent is extended or adjusted under 35 U.S.C. 154(b) by 413 days.

(21) Appl. No.: 11/408,089

(22) Filed: Apr. 21, 2006

(65) Prior Publication Data

US 2006/0282694 A1    Dec. 14, 2006

(30) Foreign Application Priority Data

May 17, 2005    (JP)    ............... 2005-143855

(51) Int. Cl.
  *G06F 1/00*    (2006.01)
  *G06F 1/32*    (2006.01)
(52) U.S. Cl. .................. 713/322; 713/300; 713/320; 713/323; 327/113; 327/115
(58) Field of Classification Search ............ 713/322, 713/300, 320, 323; 327/113, 115
See application file for complete search history.

(56) References Cited

U.S. PATENT DOCUMENTS 5,751,172 A * 5/1998 Takano .................. 327/113
7,225,353 B1 * 5/2007 Wong .................... 713/340
2004/0148533 A1 * 7/2004 Nicholas ................ 713/320

FOREIGN PATENT DOCUMENTS

JP    08-234865    9/1996

* cited by examiner

*Primary Examiner*—Chun Cao
*Assistant Examiner*—Michael J Brown
(74) *Attorney, Agent, or Firm*—Rabin & Berdo, P.C.

(57) ABSTRACT

An integrated circuit includes a volatile memory, a central processing unit that normally operates on a first clock, and an input-output circuit that transfers data in synchronization with a second clock having a lower frequency than the first clock. The integrated circuit has a power-saving mode in which the volatile memory loses its data and the central processing unit stops operating. The power-saving mode is preceded and followed by transitional periods during which the central processing unit uses the input-output circuit to save data from the volatile memory to an external memory device and restore the data from the external memory device to the volatile memory. During these transitional periods, the central processing unit operates on the second clock to conserve power.

11 Claims, 4 Drawing Sheets

INTEGRATED CIRCUIT CONSERVING POWER DURING TRANSITIONS BETWEEN NORMAL AND POWER-SAVING MODES

BACKGROUND OF THE INVENTION

1. Field of the Invention

The present invention relates to the reduction of power consumption in a microelectronic system integrated onto a single chip.

2. Description of the Related Art

Referring to FIG. 1, a single-chip system 10 of this type conventionally comprises a central processing unit (CPU) 11, a read-only memory (ROM) 12, a random-access memory (RAM) 13, a serial input-output interface (SIO) 14, a clock divider (DIV) 15, and various on-chip peripheral circuits (not shown).

The CPU 11 carries out prescribed computations and control processing according to a program stored in the chip's memory (the ROM 12 and/or RAM 13). The ROM 12 is a nonvolatile memory that retains its data even after power is switched off. Programs stored in the ROM 12 include a bootstrap program or initial program loader (IPL), interrupt handlers that handle external interrupts, and other programs. The RAM 13 is a volatile memory that loses its data when power is switched off. The RAM 13 is used to store application programs and data being processed.

The serial input-output interface 14 is used to transfer data between the CPU 11 and an external device (in this case, an external memory device 30 such as a flash memory). The serial input-output interface 14 converts parallel data received from the CPU 11 to serial data and sends the data to the external device, and converts serial data received from the external device to parallel data and supplies the data to the CPU 11. The clock divider 15 divides the frequency (for example, 10 MHz) of a system clock SCK received from an external source to obtain a high-speed clock signal CKH (with a frequency of, for example, 5 MHz), which is supplied to the CPU 11, and a low-speed clock signal CKL (with a frequency of, for example, 1 MHz), which is supplied to the serial input-output interface 14 and used for serial data transfer.

The operation of this integrated circuit during transitions between its normal mode and a power-saving mode will now be described.

When the CPU 11 has finished executing a series of processes and is ready to power down into the power-saving mode, the CPU 11 reads out the data stored in the RAM 13 and supplies the data one byte at a time to the serial input-output interface 14. The serial input-output interface 14 converts the data received from the CPU 11 to serial data synchronized with the low-speed clock signal CKL and transfers the data to the external memory device 30. When one byte of data has been transferred, the serial input-output interface 14 sends a transfer completion signal DON to the CPU 11. The CPU 11 then supplies the next byte of data to the serial input-output interface 14. When all the necessary data have been transferred to the external memory device 30, the CPU 11 powers off prescribed circuits, including the RAM 13, and goes into the power-saving mode. Even in this power-saving mode, the CPU 11, ROM 12, and clock divider 15 remain powered so that they can detect an external interrupt INT and execute a transition from the power-saving mode to the normal mode.

Upon detection of an external interrupt INT in the power-saving mode, the CPU 11 powers up the circuits that were powered off, operating according to a program stored in the ROM 12. The CPU 11 then sends a byte data read command to the serial input-output interface 14. The serial input-output interface 14 retrieves one byte of data from the external memory device 30 in response to the instruction, and sends a transfer completion signal DON to the CPU 11. The CPU 11 stores the retrieved data in the RAM 13. The CPU 11 continues to issue data read commands to the serial input-output interface 14 until all necessary data have been stored in the RAM 13. When the necessary data have been stored in the RAM 13, the CPU 11 resumes normal operation.

A microelectronic system in which a uniform transmission speed is maintained between the microelectronic system and peripheral units even when the clock frequency is changed to conserve power is described in Japanese Patent Application Publication No. 8-234865.

A problem with the integrated circuit described above is that during the transitions between the normal mode and the power-saving mode, while data are being transferred between the serial input-output interface 14 and the external memory device 30 in synchronization with the low-speed clock signal CKL supplied to the serial input-output interface 14, the CPU 11 continues to receive the high-speed clock signal CKH. The CPU 11 therefore operates on a clock signal with a higher speed than necessary, consuming power needlessly.

Moreover, the CPU 11 has to wait for an external interrupt INT and carry out a transition from the power-saving mode to the normal mode, so the high-speed clock signal CKH cannot be halted, limiting the reduction of power consumption.

SUMMARY OF THE INVENTION

An object of the present invention is to conserve power during transitions of an integrated circuit between its normal operating mode and a power-saving mode, while data are being transferred between a volatile memory in the integrated circuit and an external memory device.

The invented integrated circuit thus includes a central processing unit and a volatile memory and is connected to an external memory device. Normally, the central processing unit operates on a first clock signal and executes logic processing while the volatile memory stores data. In the power-saving mode, the central processing unit halts and the volatile memory loses its stored data. During a transition from the normal mode to the power-saving mode, the central processing unit saves data from the volatile memory to the external memory device. During a transition from the power-saving mode to the normal mode, the central processing unit restores the data from the external memory device to the volatile memory.

The integrated circuit also includes a data input-output circuit that the central processing unit uses to transfer data between the volatile memory and the external memory device, and a clock divider. The clock divider divides the frequency of the first clock signal to obtain a second clock signal and supplies the second clock signal to the data input-output circuit as a data transfer clock signal.

The integrated circuit also includes an interrupt detector, a selector, and a clock supply circuit. The interrupt detector detects an external interrupt. The selector selects the second clock signal in the power-saving mode and during the transitions between the power-saving mode and the normal mode, and selects the first clock signal in the normal mode. The clock supply circuit supplies the clock signal selected by the first selector to the central processing unit in the normal mode and during the transitional periods, and halts the clock supply in the power-saving mode.

More specifically, during a transition from the normal mode to the power-saving mode, the clock supply circuit supplies the second clock signal to the central processing unit until it finishes saving data from the volatile memory to the external memory unit. The clock supply circuit then halts the clock supply to the central processing unit until the interrupt detector detects the external interrupt, at which point the clock supply circuit resumes supply of the second clock signal while the central processing unit restores data from the external memory device to the volatile memory. When the data restoring process is finished, the first selector selects the first clock again and the central processing unit resumes normal operation.

During the transitional periods, accordingly, the central processing unit operates on the second clock signal, conserving power because the second clock signal has a lower frequency than the first clock signal. The lower frequency is adequate because during the transitional periods the central processing unit only has to keep pace with the data input-output circuit, which always operates on the second clock signal.

DETAILED DESCRIPTION OF THE INVENTION

Figure 1:
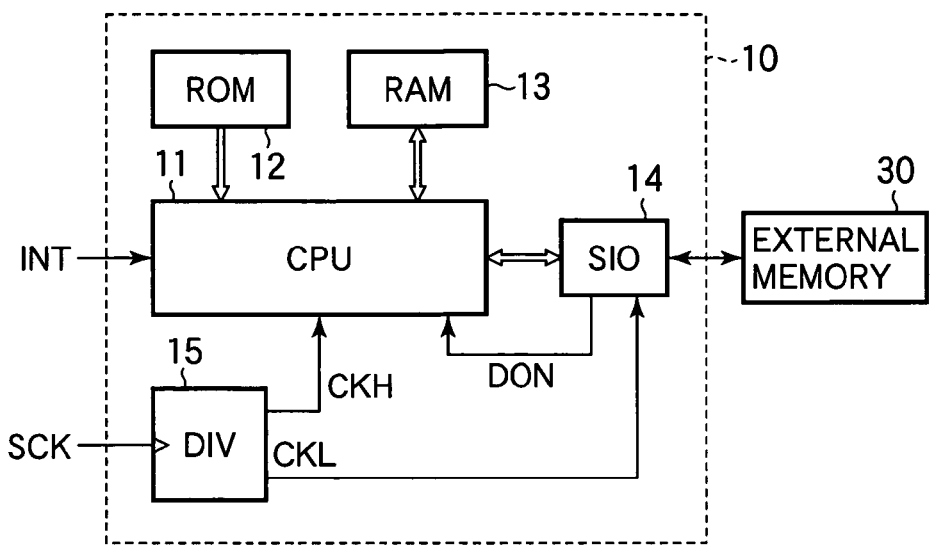
FIG. 1 is a block diagram of a conventional integrated circuit.

Embodiments of the invention will now be described with reference to the attached drawings, in which like elements are indicated by like reference characters.

FIRST EMBODIMENT

Figure 2:
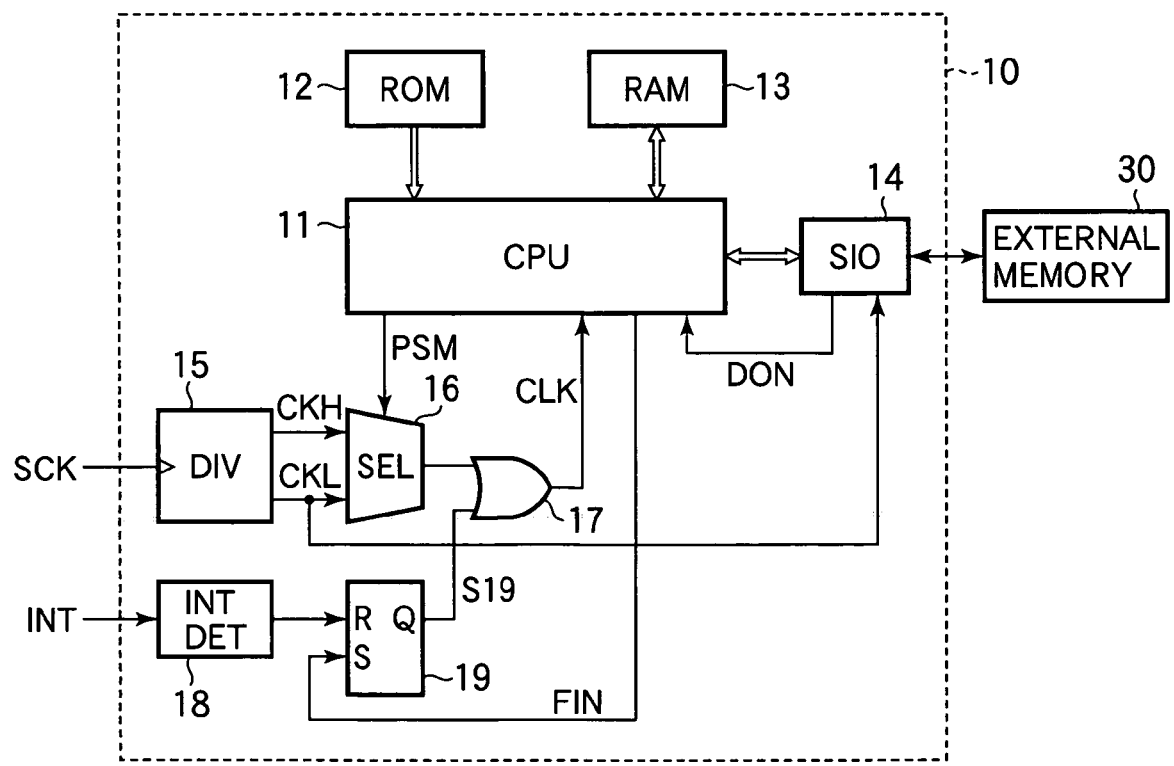
FIG. 2 is a block diagram of an integrated circuit illustrating a first embodiment of the invention.

Referring to FIG. 2, the integrated circuit 10 in the first embodiment has a CPU 11, ROM 12, RAM 13, serial input-output interface 14, and clock divider 15.

The CPU 11 carries out prescribed computation and control processing according to a program stored in the ROM 12 or RAM 13 in synchronization with a clock signal CLK. The ROM 12 stores a bootstrap program or IPL, interrupt handlers that handle external interrupts, and other programs, while the RAM 13 is used to store application programs and data being processed.

The serial input-output interface 14 carries out data transfers between the CPU 11 and the external memory device 30 (in this case, a flash memory or the like). The serial input-output interface 14 converts the parallel data received from the CPU 11 to serial data and supplies the data to the CPU 11. The serial input-output interface 14 sends a transfer completion signal DON to the CPU 11 upon completion of one byte of data transfer.

The clock divider 15 divides the frequency of the system clock SCK (for example, 10 MHz) received from an external source to obtain a high-speed clock signal CKH (with a frequency of for example 5 MHz) and further divides the frequency of the high-speed clock signal CKH to obtain a low-speed clock signal CKL (with a frequency of, for example, 1 MHz). The low-speed clock signal CKL is supplied to the serial input-output interface 14 as a timing signal for serial data transfer.

The integrated circuit 10 further comprises a selector (SEL) 16, a logical OR gate 17, an interrupt detector (INT DET) 18, a set/reset type flip-flop 19, and various peripheral circuits (not shown).

The selector 16 selects one of the two clock signals CKL and CKH generated by the clock divider 15, in response to a mode select signal PSM received from the CPU 11. The output terminal of the selector 16 is connected to one of the input terminals of the logical OR gate 17.

The interrupt detector 18 is used to detect an external interrupt INT. The output terminal of the interrupt detector 18 is connected to the reset terminal R of the flip-flop 19. The set terminal S of the flip-flop 19 receives a completion signal FIN from the CPU 11, and the output terminal of the 19 is connected to the other input terminal of the logical OR gate 17. The output signal of the logical OR gate 17 is supplied to the CPU 11 as its clock signal (CLK). The logical OR gate 17 and flip-flop 19 constitute the clock supply circuit for the CPU 11.

Figure 4:
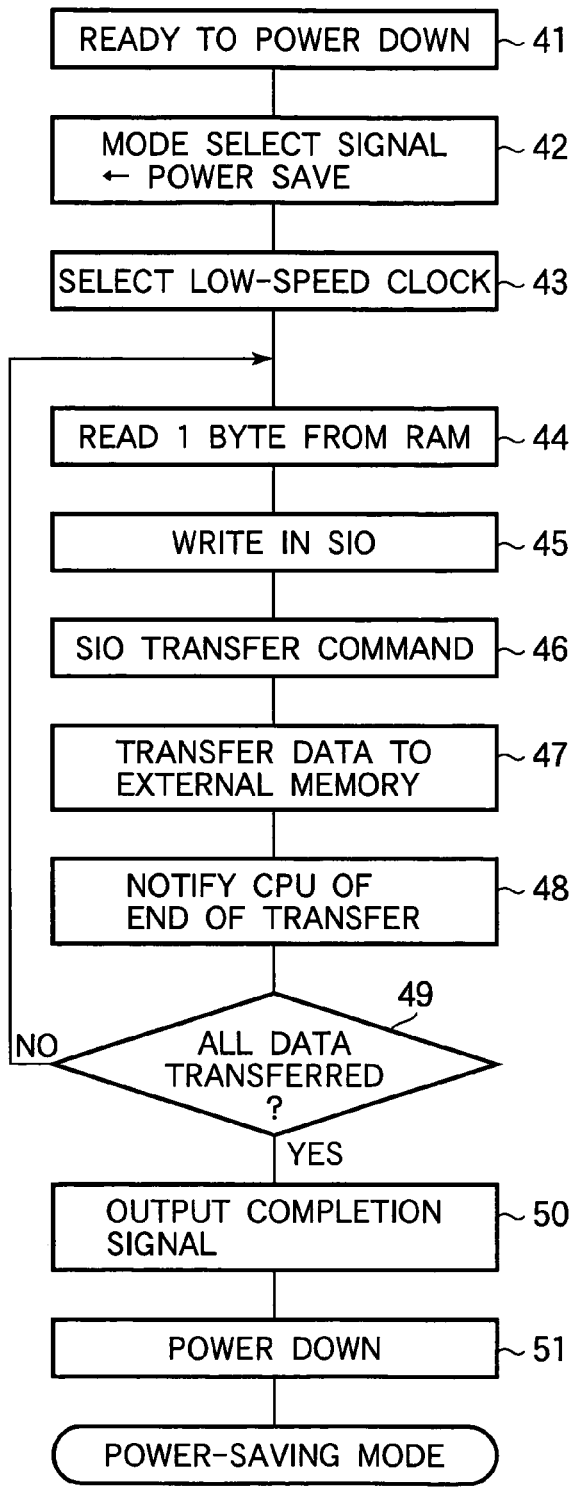
FIG. 4 is a flowchart illustrating the operation of the integrated circuit in FIG. 2 during a transition from the normal mode to the power-saving mode.
Figure 5:
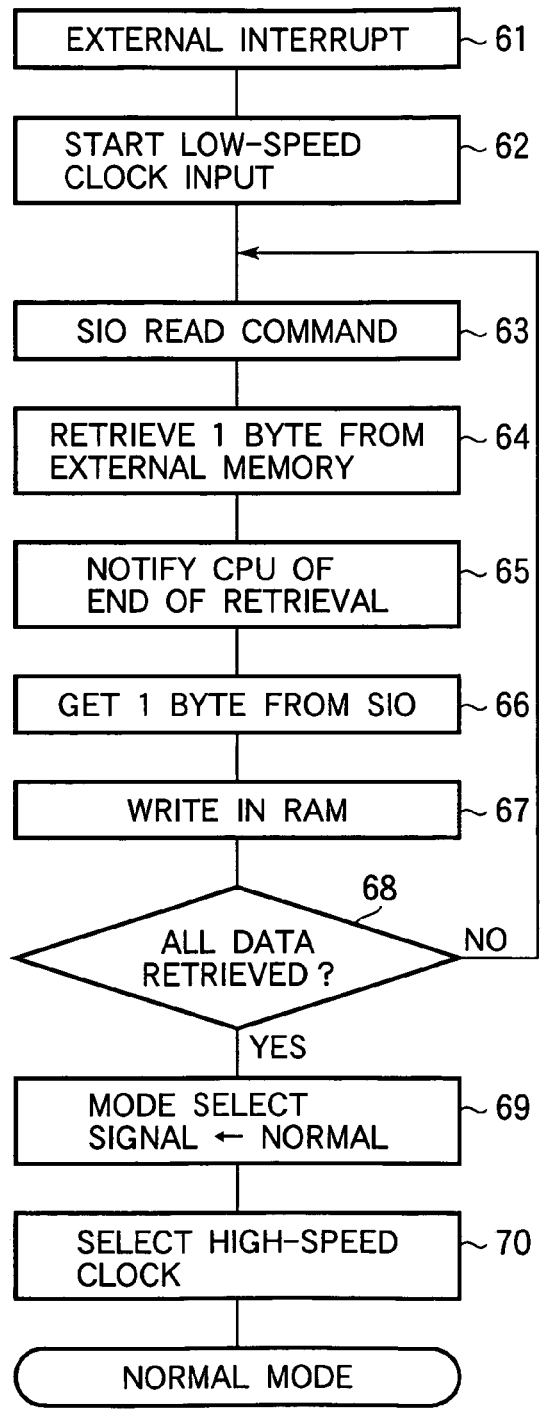
FIG. 5 is a flowchart illustrating the operation of the integrated circuit in FIG. 2 during a transition from the power-saving mode to the normal mode.

The operation of the integrated circuit 10 in FIG. 2 will now be described with reference to the signal waveform diagram in FIG. 3 and the flowcharts in FIGS. 4 and 5.

Normal Operation

Figure 3:
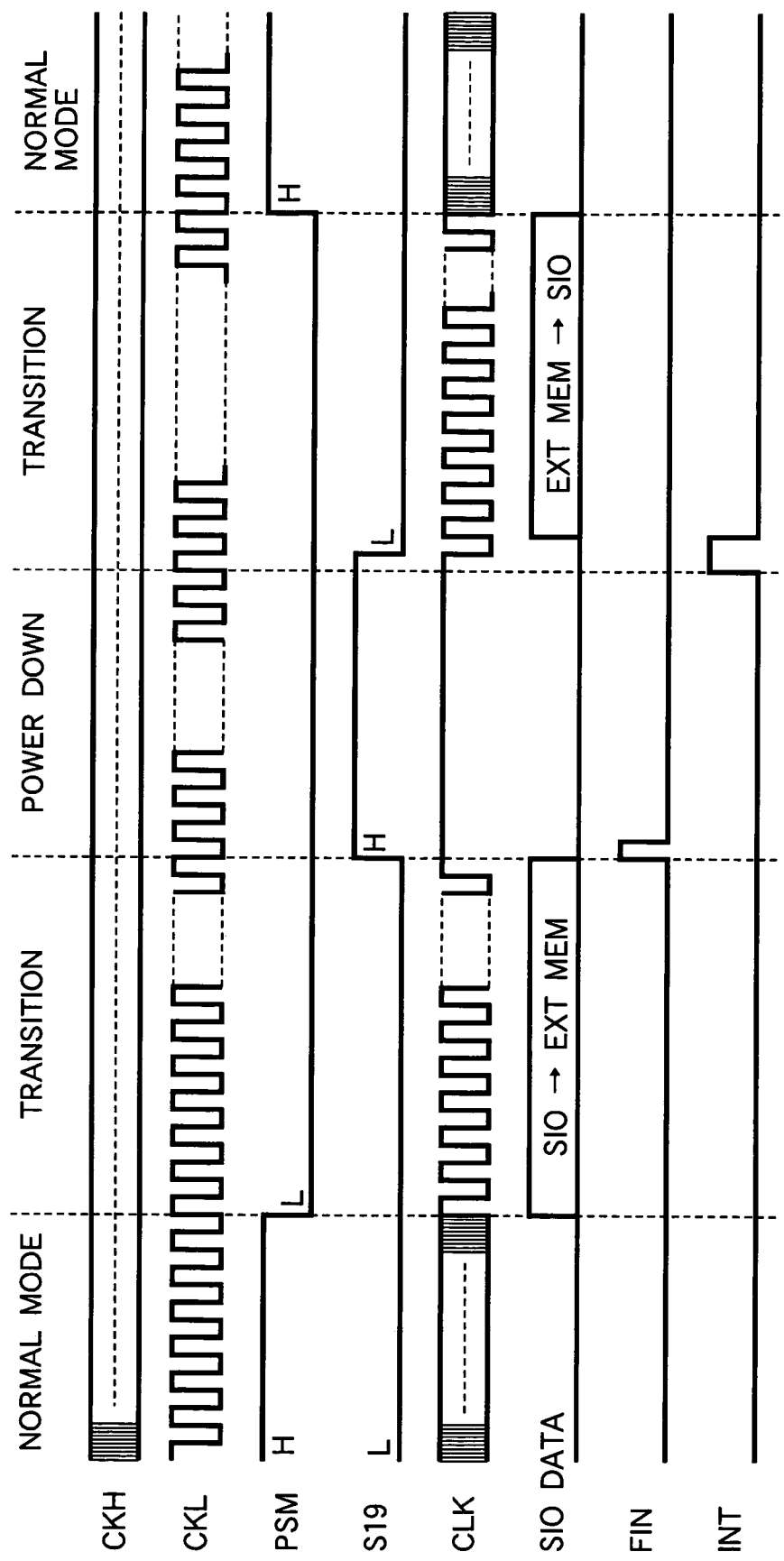
FIG. 3 is a signal waveform diagram illustrating the operation of the integrated circuit in FIG. 2.

In normal operation, the flip-flop 19 is reset, and the signal S19 output from the flip-flop 19 is at the low logic level (L in FIG. 3). The mode select signal PSM supplied to the selector 16 from the CPU 11 is set (to the high logic level, H in FIG. 3, for example) to select the normal operation mode, and the high-speed clock signal CKH generated by the clock divider 15 is selected and supplied to the logical OR gate 17. Thus the 5-MHz clock signal CKH is supplied to the CPU 11 as its clock signal CLK. The 1-MHz clock signal CKL is supplied to the serial input-output interface 14 as the data transfer clock signal.

Transition to Power-Saving Mode

When the CPU 11 has finished executing a series of processes and is ready to power down into the power-saving mode (step 41 in FIG. 4), the CPU 11 switches the mode select signal PSM (to the low logic level, for example) to select the power-saving mode (step 42). The low-speed clock signal CKL is selected by the selector 16 and supplied to the CPU 11 through the logical OR gate 17 as the clock signal CKL (step 43). Thus the frequency of the clock signal CLK supplied to the CPU 11 is reduced from 5 MHz to 1 MHz, as shown in FIG. 3.

Operating on the 1-MHz clock signal, the CPU 11 reads one byte of the data stored in the RAM 13 (step 44), supplies the data to the serial input-output interface 14 (step 45), and gives a serial transfer command (step 46). Also operating on the 1-MHz clock signal, the serial input-output interface 14 converts the data received from the CPU 11 to serial data and transfers the data to the external memory device 30 (step 47). When the transfer of one byte of data is completed, the serial input-output interface 14 sends a completion signal DON to the CPU 11 (step 48). The CPU 11 then supplies the next byte of data to the serial input-output interface 14 (step 44). When all the necessary data have been transferred to the external memory device 30 (step 49), the CPU 11 sends a completion signal FIN to the flip-flop 19 (step 50) and powers off the RAM 13, the serial input-output interface 14, and other prescribed circuits (not shown) to enter the power-saving mode (step 51).

Power-Saving Operation

The circuits that have been powered off stop operating and lose their stored information. When the flip-flop 19 is set by the completion signal FIN, the S19 signal goes high, and the clock signal CLK output from the logical OR gate 17 is held fixed at the high level, as shown in FIG. 3. The CPU 11 then stops operating, but as its power is not switched off, the CPU 11 remains in the state it was in just before it stopped operating. The mode select signal PSM output from the CPU 11 therefore remains low. Meanwhile, the interrupt detector 18 is kept constantly powered to await the input of an external interrupt INT.

Transition from Power-Saving Mode to Normal Mode Upon detection of an external interrupt INT in the power-saving mode (step 61 in FIG. 61), the interrupt detector 18 resets the flip-flop 19. The signal S19 then goes low, and the clock signal CKL selected by the selector 16 is supplied to the CPU 11 as its clock signal CLK (step 62).

The CPU 11 resumes operation from the state it was in before it stopped operating, and provides power to the circuits, such as the RAM 13, that were powered off to reduce power consumption.

The CPU 11 then sends a byte data read command to the serial input-output interface 14 (step 63). The serial input-output interface 14 retrieves one byte of data from the external memory device 30 (step 64), and sends a transfer completion signal DON to the CPU 11 (step 65). The CPU 11 stores the retrieved data in the RAM 13 (steps 66 and 67). The CPU 11 continues to issue data read commands to the serial input-output interface 14 (step 63) until all necessary data have been retrieved and stored in the RAM 13. When the necessary data have been stored (step 68), the CPU 11 switches the mode select signal PSM to the normal level (step 69, the high level in FIG. 3). The high-speed clock signal CKH is then selected by the selector 16 and supplied to the CPU 11 as the clock signal CLK (step 70), and the CPU 11 resumes normal operation.

As described above, the integrated circuit 10 in the first embodiment has a selector 16 that switches the clock signal CLK supplied to the CPU 11 to the low-speed clock signal CKL during the transitions between the power-saving mode and the normal mode. Power consumption by the CPU 11 is thereby reduced during the transfer of data between the RAM 13 and the external memory device 30.

The integrated circuit 10 also has a logical OR gate 17 that halts the clock signal CLK supplied to the CPU 11 in the power-saving mode. The CPU 11 therefore stops operating in the power-saving mode, and the power consumption of the CPU 11 is further reduced.

The data transfer carried out between the integrated circuit 10 and the external memory device 30 is a serial transfer, but the invention can also be practiced with an external memory device that carries out parallel data transfer. In that case, a parallel input-output circuit should be used in place of the serial input-output interface 14.

The clock divider 15 divides the frequency of the system clock SCK by two to generate the high-speed clock signal CKH, and by ten to generate the low-speed clock signal CKL, but the invention can be practiced with other frequency division ratios. For example, it is possible to use the system clock SCK directly as the high-speed clock signal CKH without dividing the frequency.

SECOND EMBODIMENT

Figure 6:
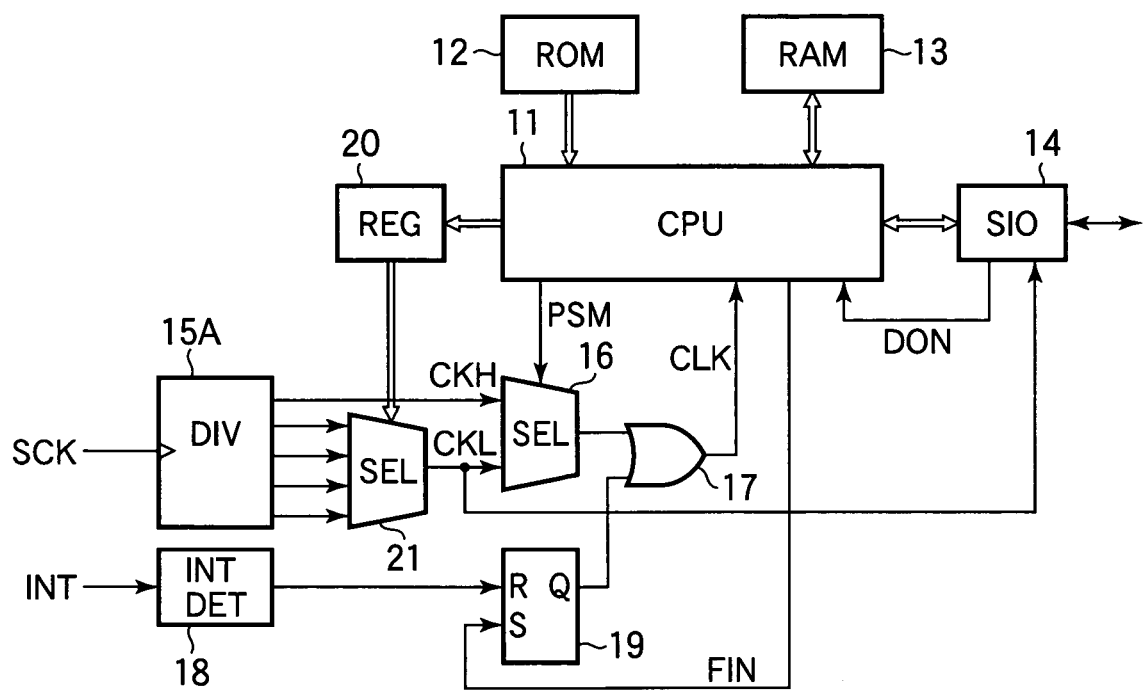
FIG. 6 is a block diagram of an integrated circuit illustrating a second embodiment of the invention.

Referring to the block diagram in FIG. 6, the second embodiment adds a register (REG) 20 and a second selector 21 to the integrated circuit in the first embodiment, and uses a different clock divider 15A, which divides the frequency of the system clock SCK to generate a plurality of low-speed divided clock signals, as well as the high-speed clock signal CKH.

Selector 21 selects one of the plurality of low-speed divided clock signals generated by the clock divider 15A according to the value set in the register 20 and outputs the selected clock signal as the low-speed clock signal CKL. The value in the register 20 is set by the CPU 11. The high-speed clock signal CKH generated by the clock divider 15A and the low-speed clock signal CKL selected by selector 21 are supplied to selector 16, which selects one of the two clock signals according to the mode select signal PSM received from the CPU 11. In other respects, the second embodiment has the same configurations as the first embodiment illustrated in FIG. 2.

The integrated circuit in FIG. 6 operates in the same way as the integrated circuit in FIG. 2, with the exception that the low-speed clock signal CKL is selected according to the value set in the register 20.

The integrated circuit in the second embodiment has a first selector 16 that switches the clock signal CLK supplied to the CPU 11 to a low-speed clock signal CKL during the transitions between the power-saving mode and the normal mode, and a logical OR gate 17 that halts the clock signal CLK supplied to the CPU 11 in the power-saving mode. Therefore, the second embodiment provides the same advantages as the first embodiment.

Furthermore, the integrated circuit in the second embodiment has a register 20 and a second selector 21 for selecting the low-speed clock signal CKL. This offers the advantage that the optimal frequency of the data transfer clock signal CKL can be selected according to the data transfer rate of the external memory device.

The integrated circuit in FIG. 6 is configured to have the CPU 11 set a value in the register 20, but it is also possible to have the value set by the external memory device, using signals from a connector connecting the serial input-output interface 14 and the external memory device, or to replace the register 20 with an external switch.

Those skilled in the art will recognize that further variations are possible within the scope of the invention, which is defined in the appended claims.

What is claimed is:

1. An integrated circuit operable in a normal mode and a power-saving mode, the integrated circuit being connected to an external memory device, the integrated circuit comprising:
 a volatile memory that stores data in the normal mode and loses the stored data in the power-saving mode;
 a central processing unit that executes logic processing in the normal mode, saves data from the volatile memory to the external memory device during a transition from the normal mode to the power-saving mode, and restores the data from the external memory device to the volatile memory during a transition from the power-saving mode to the normal mode;

a data input-output circuit that transfers data between the central processing unit and the external memory device, thereby enabling the central processing unit to save and restore the data;

a clock divider that divides the frequency of an external clock signal to obtain a first clock signal and a second clock signal, the first clock signal having a higher frequency than the second clock signal, and supplies the second clock signal to the data input-output circuit as a data transfer clock signal;

a first selector controlled by the central processing unit to select the first clock signal in the normal mode, the second clock signal in the power-saving mode, and the second clock signal during the transitions between the power-saving mode and the normal mode;

an interrupt detector for detecting an external interrupt; and a clock supply circuit connected between the first selector and the central processing unit, and also between the interrupt detector and the central processing unit, supplying the clock signal selected by the first selector to the central processing unit during the normal mode, halting supply if the selected clock signal to the central processing unit when the central processing unit finishes saving the data from the volatile memory to the external memory unit, and resuming supply of the selected clock signal to the central processing unit when the external interrupt is detected.

2. The integrated circuit of claim 1, wherein the clock supply circuit comprises:

a flip-flop circuit set to a first state by a signal from the interrupt detector indicating detection of the external interrupt and to a second state by a signal from the central processing unit indicating completion of transfer of data from the volatile memory to the external memory device, and generating a control signal having one logic level in the first state and another logic level in the second state; and a logic gate for performing a logic operation on the clock signal selected by the first selector and the control signal generated by the flip-flop circuit to generate the clock signal supplied to the central processing unit.

3. The integrated circuit of claim 2, wherein the logic gate is an OR gate.

4. The integrated circuit of claim 1, wherein the clock divider divides the frequency of the external clock signal, or the frequency of the first clock signal, by a plurality of ratios to generate a plurality of clock signals with frequencies lower than the frequency of the first clock signal, further comprising a second selector that selects one of said plurality of clock signals and supplies the selected clock signal to the first selector as the second clock signal.

5. The integrated circuit of claim 4, further comprising a register for storing control data that control the second selector.

6. The integrated circuit of claim 5, wherein the control data are written in the register by the central processing unit.

7. The integrated circuit of claim 5, wherein the control data are written in the register by the external memory device.

8. The integrated circuit of claim 4, wherein the second selector is controlled by an external switch.

9. The integrated circuit of claim 1, wherein the data input-output circuit performs serial data transfer.

10. The integrated circuit of claim 1, wherein the data input-output circuit performs parallel data transfer.

11. The integrated circuit of claim 1, wherein the clock supply circuit halts the supply of the selected clock signal to the central processing unit it response to the first signal from the central processing unit indicating completion of transfer of data from the volatile memory to the external memory unit, and resumes the supply of the selected clock signal to the central processing unit in response to a second signal from the interrupt detector indicating detection of the external interrupt.

* * * * *

UNITED STATES PATENT AND TRADEMARK OFFICE
CERTIFICATE OF CORRECTION

PATENT NO.        : 7,600,142 B2
APPLICATION NO.   : 11/408089
DATED             : October 6, 2009
INVENTOR(S)       : Takeshi Ichikawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this

Fifth Day of October, 2010

David J. Kappos
*Director of the United States Patent and Trademark Office*